Sept. 4, 1956 R. GEHRER 2,761,547
ROLLERS
Filed Feb. 14, 1955
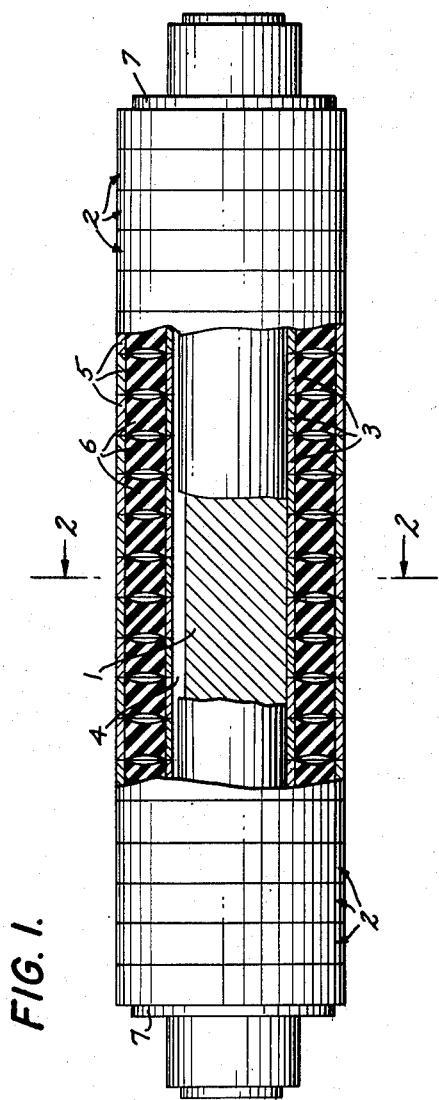
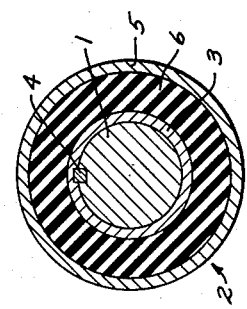
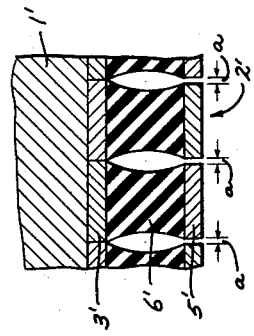
INVENTOR
Rudolf Gehrer
BY
Michael S. Striker
agt.

United States Patent Office 2,761,547
Patented Sept. 4, 1956

2,761,547
ROLLERS

Rudolf Gehrer, Stuttgart-Bad Cannstatt, Germany, assignor to Fortuna Werke Spezialmaschinenfabrik A.-G., Stuttgart-Bad Cannstatt, Germany Application February 14, 1955, Serial No. 487,994

Claims priority, application Germany October 22, 1954

1 Claim. (Cl. 198—127)

The present invention relates to rollers.

More particularly, the present invention relates to a roller arrangement to be used as a conveyor or feed roller.

There exist in the art feed and conveyor rollers which are used in various types of conveyors for moving work pieces along certain work paths. Inasmuch as conveyors are usually adapted to convey work pieces of different sizes, a suitable arrangement must be provided by means of which such differently sized work pieces may be moved along the work path from a supply point, past work zones in which the work pieces are treated, and to a delivery point where the finished work pieces may be removed from the conveyor. In order to accommodate differently sized work pieces, the known conveyors usually include a more or less rigid roller member which rotates about an axis of rotation which is movable relative to the work path. Suitable biasing means are usually provided so that the feed or conveyor roller will engage the smallest work piece to be transported by the conveyor but will also be capable of moving at least partly out of the work path so as to accommodate larger work pieces. Such arrangements have been found unsuitable in view of the complex mounting structures required therefor, which mounting structures often include a relatively large number of structural elements. Consequently, known conveyor arrangements which are capable of accommodating work pieces of different sizes have a relatively short useful life and additionally require expensive maintenance.

It is, therefore, one of the objects of the present invention to overcome the above disadvantages by providing a conveyor or feed roller arrangement which is capable of accommodating work pieces of widely varying size.

It is another object of the instant invention to provide a conveyor or feed roller which may be mounted for rotation about a stationary axis of rotation.

It is yet another object of the present invention to provide a conveyor or feed roller which requires a minimum number of parts, which is sturdy, which may be mass-produced economically and which has an extremely long, useful life.

The objects of the present invention further include the provision of a roller which is adapted to be used either as a conveyor roller or as a feed roller for conveying or feeding work pieces of varying size.

It is a still further object of the instant invention to provide a roller element, a plurality of which may readily be mounted on any suitable shaft means so as to form a feed or conveyor roller adapted to accommodate work pieces of widely varying size.

With the above objects in view, the present invention mainly consists in a conveyor or feed roller which comprises a cylindrical shaft member and a plurality of substantially equally-shaped or identical annular roller elements mounted thereon adjacent to each other. Each of the roller elements includes an inner annular member which is non-rotatably mounted on the shaft means, an intermediate annular resilient member encompassing and firmly secured to the outer peripheral surface of the inner annular member, and an outer annular member encompassing and firmly secured to the outer peripheral surface of the intermediate annular resilient member. The outer annular member has a resiliency which is substantially smaller than the resiliency of the intermediate annular resilient member and is, in a preferred embodiment, narrower than the inner annular member. The outer peripheral surfaces of the outer annular members together form the outer surface of the conveyor roller and the resiliency of the intermediate annular resilient members permits movement of the outer annular members relative to the shaft means and to each other and consequently movement of portions of the outer surface of the conveyor roller relative to each other.

First fastening means may be provided for fastening the inner annular members to the shaft means so that the former are non-rotatable relative to the latter, and second fastening means may be provided for preventing axial movement of the annular roller elements relative to the shaft means.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Fig. 1 is an elevational view, partly in section, of a preferred embodiment of the present invention;

Fig. 2 is a sectional view taken on line II—II of Fig. 1; and

Fig. 3 is a fragmentary sectional elevational view of another preferred embodiment of the present invention.

Referring now to the drawing, and to Figs. 1 and 2 thereof in particular, there is illustrated a preferred embodiment of the present invention which comprises a cylindrical shaft member 1 on which a plurality of substantially identical or equally-shaped annular roller elements 2 are mounted adjacent to each other.

Each of the annular roller elements consists of an inner annular member 3 upon the outer peripheral surface of which an annular resilient member 6 is firmly secured. An outer annular member 5 encompasses and is firmly secured to the outer peripheral surface of the annular resilient member 6, so that the outer peripheral surfaces of the outer annular members 5 together form the outer surface of the conveyor roller.

The annular roller elements 2 are non-rotatably fastened to the shaft 1 by means of a polygonal key 4 whics engages suitable grooves in the outer surface of the shaft 1 and the inner surface of each of the inner annular members 3.

Suitable end plates 7 may be connected to the shaft 1 in a manner well known in the art, which end plates 7 engage at least the inner annular members 3 of the outermost of the annular roller elements so as to prevent axial movement of all of the roller elements relative to the shaft 1.

In the preferred embodiment, the inner and outer annular members 3 and 5 of each roller element are made of steel and the annular resilient member 6 is made of rubber or any other suitable elastic and/or resilient substance. The annular resilient member 6 may be glued or vulcanized to each of the inner and outer annular members 3 and 5 so that it will be understood that the outer annular member 5 has a resiliency which is substantially smaller than the resiliency of the annular resilient member 6. Consequently, the annular resilient members 6 permit movement of the outer annular members 5 relative to the shaft means and to each other, so that portions of the outer surface of the roller arrangement may move relative to the shaft 1 and to each other.

When the shaft 1 is mounted for rotation about an axis of rotation, the outer peripheral portions of the outer annular members 5 are adapted to engage work pieces to be moved by the roller. In the event the roller is engaged by a work piece of a certain size the outer annular members of the annular roller elements may move relative to the shaft 1. As a result, the annular resilient member 6 which normally maintains the annular members 3 and 5 in substantially concentric relationship relative to each other, is subjected to certain stresses and permits these annular members to assume an eccentric relationship relative to each other. Consequently, the conveyor roller is capable of readily engaging work pieces of widely varying size without there being any danger of damage either to the work piece, the roller or the mounting therefor.

The elasticity and/or resiliency of the members 6 may be selected so that upon rotation of the shaft 1 the driving force may be transmitted to the outer peripheral surfaces of the outer annular members 5 as desired.

If desired, the annular resilient member 6 need not fill the entire annular space between the inner and outer annular members 3 and 5 but may have a cross-sectional configuration so that the annular faces of the resilient members 6 are out of contact with each other, as shown in Fig. 1, thereby allowing free independent movement of the roller elements 2. For example, the annular resilient member 6 may have a substantially I-shaped cross-sectional configuration.

In the embodiment illustrated in Fig. 3, each annular roller element 2' consists of an inner annular member 3' which is mounted upon a shaft 1'. An annular resilient member 6' is firmly secured to the outer peripheral surface of the inner annular member 3', and an outer annular member 5' encompasses and is firmly secured to the outer peripheral surface of the annular resilient member 6'. As is clearly illustrated in Fig. 3, the annular member 5' is narrower than the inner annular member 3' so that the outer annular members 5' are axially spaced from each other a distance $a$. Such an arrangement permits free independent movement of the outer annular members 5'.

If desired, the annular resilient members 6 may be secured directly on the shaft 1, thereby dispensing with the inner annular members 3.

While in the preferred embodiments the several roller elements 2 are substantially equally-shaped or identical, it will be understood that, if desired, the roller elements may differ from each other, in that either the diameters of the outer annular members may be different, or that the characteristics of the resilient members 6 may be dissimilar.

A feed or conveyor roller arrangement according to the present invention may advantageously be used in connection with machine tools for moving non-deformable work pieces, such as metal, wood, plastic, etc. as well as deformable work pieces, such as leather, rubber, cork and the like.

It will be understood that each of the elements described above, or two or more together, may also find a useful application in other types of roller constructions differing from the types described above.

While the invention has been illustrated and described as embodied in feed or conveyor rollers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A conveyor roller comprising, in combination, shaft means; a plurality of substantially identical annular roller elements mounted on said shaft means adjacent to each other, each of said roller elements including an inner annular member mounted on said shaft means, an intermediate annular resilient member having throughout its entire annular length a substantially constant cross-sectional configuration and encompassing and firmly secured to the outer peripheral surface of said inner annular member, and an outer annular member encompassing and firmly secured to the outer peripheral surface of said intermediate annular resilient member and having a resiliency which is substantially smaller than the resiliency of said intermediate annular resilient member, said outer annular member having an axial length slightly smaller than that of said inner annular member so that consecutive outer annular members are axially spaced slightly from each other a distance corresponding to the difference between the axial lengths of said inner and outer annular members, the outer peripheral surfaces of each of said outer annular members forming an outer peripheral surface portion of the conveyor roller, said outer perpheral surface portion being axially spaced said distance from each other and together forming a discontinuous outer surface of the conveyor roller with the resiliency of said intermediate annular resilient members permitting movement of each of said outer annular members and consequently of each of said surface portions relative to the respective inner annular member; first fastening means for non-rotatably fastening said inner annular members to said shaft means so that said intermediate annular resilient members permit movement of said outer annular members relative to said shaft means and to each other and consequently movement of said outer surface portions of the conveyor roller relative to each other; and second fastening means on said shaft means and engaging at least the inner annular members of the outermost of said plurality of annular roller members for preventing axial movement of said plurality of annular roller members relative to said shaft means.

References Cited in the file of this patent

UNITED STATES PATENTS 2,632,560   Wright _____ June 6, 1950